United States Patent Office 3,153,093
Patented Oct. 13, 1964

3,153,093
AMINO DERIVATIVES OF N-CYCLO-
PROPYLBENZYLAMINES
Bruce Wayne Horrom and Leo Ralph Swett, Waukegan,
Ill., assignors to Abbott Laboratories, North Chicago,
Ill., a corporation of Illinois
No Drawing. Filed Nov. 22, 1961, Ser. No. 154,326
10 Claims. (Cl. 260—570.5)

The present invention is concerned with compounds corresponding to the formula

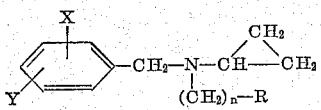

and methods for their preparation. In this and succeeding formulas, X and Y are each independently selected from the group consisting of hydrogen, loweralkyl, chlorine, bromine, hydroxy, loweralkoxy, amino and loweralkylamino, $n$ is a number from 2 to 4, inclusive, and R represents amino, monoloweralkylamino, diloweralkylamino, piperidyl, pyridyl or morpholino. The terms "loweralkyl" and "loweralkoxy" as employed herein refer to the alkyl and alkoxy radicals containing from 1 to 4 carbon atoms, inclusive.

These new compounds are colorless liquids readily soluble in many organic solvents but substantially insoluble in water. They are useful as monoamine oxidase inhibitors and as such can be administered orally per se or admixed with a non-toxic, pharmaceutical carrier to warm-blooded animals in order to improve or completely eliminate the annoying symptoms of depression. In a representative operation, N-cyclopropyl-N-(β-diethylaminoethyl)-benzylamine completely inhibited the depressing effects of monoamine oxidase in mice when administered orally at a dosage of 25 mg. per kg. of body weight.

The compounds wherein R is diloweralkylamino, piperidyl, pyridyl or morpholino can be readily prepared by reacting equimolar proportions of a cyclopropylamine of the formula

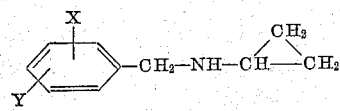

with a compound of the formula

wherein R' is diloweralkylamino, piperidyl, pyridyl or morpholino and Hal is chlorine or bromine. The reaction is preferably carried out at the reflux temperature in the presence of an inert solvent such as ethanol and a hydrohalide acceptor such as sodium carbonate. When the reaction is complete, any solids which form are removed by filtration, the solvent removed from the filtrate and the residue extracted with ether. Upon distillation of the ether extracts under reduced pressure, the desired products are obtained as colorless liquids.

The compounds wherein R is amino or monoloweralkylamino are prepared as shown in the following series of reactions in which Z is OH, Br or Cl and R" is hydrogen or loweralkyl:

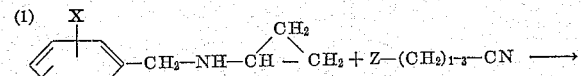

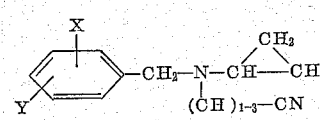

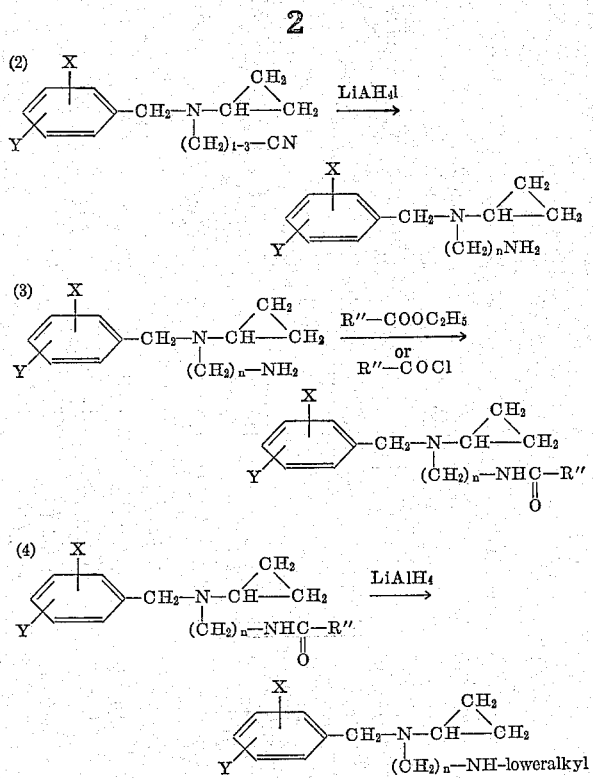

Reaction 1 is carried out by dissolving the cyclopropylamine in an inert solvent such as methanol and adding an equimolar amount of the nitrile compound thereto at a temperature of about 0° C. The solvent is thereafter removed and the residue fractionally distilled. Reactions 2 and 4 are performed by dissolving lithium aluminum hydride in ether and adding thereto an equimolar proportion of the intermediate product prepared in Reactions 1 and 3 at such a rate as to maintain gentle reflux. Following the addition, the reaction mixture is refluxed for about 4 hours to complete the reaction. The complex formed is then decomposed with water, the solvent is removed and the residue fractionally distilled. Reaction 3 is carried out by refluxing the appropriate benzylamine with a stoichiometric excess of an ethyl ester or acid chloride, removing said excess ester or acid chloride upon completion of the reaction and distilling the residue under reduced pressure.

The following examples which are described in detail merely illustrate some specific embodiments of the invention but are not to be construed as limiting.

EXAMPLE 1

N-Cyclopropyl-N-(β-Diethylaminoethyl)-Benzylamine

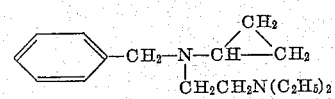

A mixture of 29.4 grams (0.2 mole) of N-cyclopropylbenzylamine, 34.4 grams (0.2 mole) of β-diethylaminoethyl chloride, 31.8 grams (0.3 mole) of anhydrous sodium carbonate and 300 ml. of ethanol was refluxed for 18 hours. The reaction mixture was then filtered and the ethanol removed from the filtrate. To the liquid residue was added 50 ml. of water and 25 ml. of a saturated, aqueous sodium hydroxide solution. After extraction of the aqueous mixture with ether, the ether extract was dried and distilled to obtain the desired product which boiled at 111°–113° C. at 1 mm. pressure and had a refractive index of $n_D^{25}=1.5000$.

EXAMPLE 2

By reacting equimolecular proportions of N-cyclopropyl- N -p-chlorobenzylamine and β-dimethylaminoethyl chloride as described in Example 1, there is obtained N-cyclopropyl-N-(β-dimethylaminoethyl) - p - chlorobenzylamine having the formula

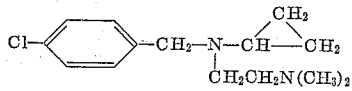

the dihydrochloride salt of which melts at 186° C.

EXAMPLE 3

The reaction of N-cyclopropyl-N - 3,4 - dichlorobenzylamine with β-diethylaminoethyl bromide in the same manner as that described in Example 1 results in the formation of N-cyclopropyl-N - (β - diethylaminoethyl)-3,4-dichlorobenzylamine of the formula

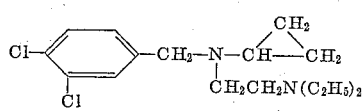

which boils at 160° C. at 1 mm. pressure and has a refractive index $n_D^{25}$ of 1.5240.

EXAMPLE 4

By substituting N-cyclopropyl-N-o-bromobenzylamine for the N-cyclopropylbenzylamine in Example 1, one obtains N-cyclopropyl-N-(β-diethylaminoethyl) - o - bromobenzylamine corresponding to the formula

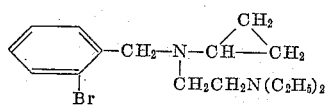

boiling at 136°–137° C. at 0.5 mm. pressure and having a refractive index $n_D^{25}$ of 1.5268.

EXAMPLE 5

N-cyclopropyl-N - (β - diethylaminoethyl) - 3,4 - dimethoxybenzylamine of the formula

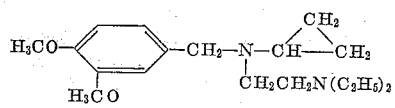

is readily obtained by reacting N-cyclopropyl-N-3,4-dimethoxybenzylamine with β-diethylaminoethyl chloride in the same manner as that described in Example 1. The product has a boiling point of 171°-173° C. at 0.5 mm. pressure and a refractive index $n_D^{25}$ of 1.5134.

If desired, β-dipropylaminoethyl chloride, β-dibutylaminoethyl bromide, γ-dibutylaminopropyl chloride, Δ-dibutylaminobutyl bromide, β-pyridylethyl chloride, γ-pyridylpropyl chloride, Δ-pyridylbutyl chloride, β-piperidylethyl chloride, γ-piperidylpropyl chloride, Δ-piperidylbutyl chloride, β-morpholinoethyl bromide, γ-morpholinopropyl bromide or Δ-morpholinobutyl chloride can be reacted as described in the foregoing examples with other cyclopropyl benzylamines such as N-cyclopropyl-N-p-bromobenzylamine, N-cyclopropyl-N-2,4-dibromobenzylamine, N-cyclopropyl-N-p-methylbenzylamine, N-cyclopropyl-N-o-butylbenzylamine, N-cyclopropyl-N - 2,6 - diethylbenzylamine, N-cyclopropyl-N-3,4-dipropylbenzylamine, N-cyclopropyl-N-m-hydroxybenzylamine, N-cyclopropyl-N-p-butoxybenzylamine, N-cyclopropyl-N - 3,5-diethoxybenzylamine, N-cyclopropyl-N - o - aminobenzylamine, N-cyclopropyl-N-p-methylaminobenzylamine, N-cyclopropyl-N-o-propylaminobenzylamine, N-cyclopropyl-N-2,4-diethylaminobenzylamine or N-cyclopropyl-N-2,6-dibutylaminobenzylamine to obtain the corresponding amino derivatives of the cyclopropylbenzylamines employed, all of which compounds are considered to be within the scope of the present invention.

EXAMPLE 6

N-Cyclopropyl-N-(β-Aminoethyl)-Benzylamine

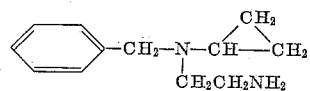

A solution of 99 grams (0.65 mole) of N-cyclopropylamine in 150 ml. of methanol was cooled to 0° C. and added dropwise with stirring to 53 grams (0.65 mole) of glycolonitrile. The temperature was maintained below 5° C. during the addition. When the addition was complete, the reaction mixture was stirred at 5° C. for 90 minutes and thereafter allowed to stand at room temperature overnight. The solvent was then removed and the residue fractionally distilled to obtain the intermediate N-cyclopropyl-N-cyanomethyl-benzylamine which boiled at 133°–135° C. at 0.9 mm. pressure and had a refractive index $n_D^{25}$ of 1.5161.

In the second step of the reaction, 37.2 grams (0.2 mole) of N-cyclopropyl-N-cyanomethyl-benzylamine was dissolved in 100 ml. of ether and added slowly to 7.6 grams (0.2 mole) of lithium aluminum hydride in 250 ml. of ether at such a rate that gentle reflux was maintained. The reaction mixture was then refluxed for 3 hours. The complex which formed was decomposed by the successive addition of 7.2 ml. of water, 7.2 ml. of 15% aqueous sodium hydroxide solution and 21.6 ml. of water. After filtering and removing the ether, the residue was distilled to obtain the N-cyclopropyl-N-(β-aminoethyl)-benzylamine product boiling at 126°–128° C. at 0.5 mm. pressure and having a refractive index $n_D^{25}=1.5254$.

EXAMPLE 7

By replacing the glycolonitrile of Example 6 with 3-bromopropionitrile, there is readily obtained N-cyclopropyl-N-β-cyanoethyl-benzylamine boiling at 140°–141° C. at 2.5 mm. pressure and having a refractive index $n_D^{25}$ of 1.5208 which when reduced with lithium aluminum hydride results in the formation of N-cyclopropyl-N-(γ-aminopropyl)-benzylamine having the formula

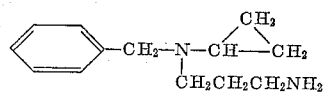

which boils at 135°–136° C. at 5 mm. pressure and has a refractive index $n_D^{25}$ of 1.5232.

In a similar manner, any compound of the formula

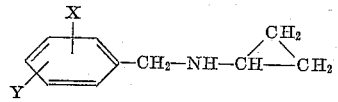

can be reacted with glycolonitrile, 3-bromopropionitrile or 4-chlorobutyronitrile to obtain the corresponding N-cyclopropyl-N-cyanoalkyl-benzylamines which when reduced with lithium aluminum hydride result in the formation of compounds of the formula

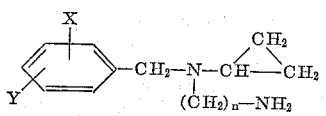

EXAMPLE 8

N-Cyclopropyl-N-(β-Methylaminoethyl)-Benzylamine

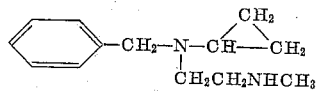

A mixture of 49 grams (0.25 mole) of N-cyclopropyl-N-(β-aminoethyl)-benzylamine and 29 grams (0.40 mole) of ethyl formate was refluxed for 24 hours. The excess ethyl formate was removed and the residue distilled to obtain the intermediate N-cyclopropyl-N-(β-formylaminoethyl)-benzylamine which boiled at 164°–166° C. at 0.6 mm. pressure and had a refractive index $n_D^{25}$ of 1.5361. Thereafter, 32.6 grams (0.14 mole) of the intermediate product in 100 ml. of ether was added to 5.31 grams (0.14 mole) of lithium aluminum hydride in 250 ml. of ether at such a rate as to maintain gentle reflux. The reaction mixture was then stirred and refluxed for 4 hours. The complex which formed was decomposed by adding successively 5 ml. of water, 5 ml. of 15% aqueous sodium hydroxide solution and 15 ml. of water. After filtering and evaporating the ether, the residue was fractionally distilled to obtain the desired N-cyclopropyl-N-(β-methylaminoethyl)-benzylamine boiling at 95°–96° C. at 1 mm. pressure and having a refractive index $n_D^{25}$ of 1.5148.

EXAMPLE 9

The reaction of N-cyclopropyl-N-(γ-aminopropyl)-benzylamine with ethyl formate in the same manner as that described in Example 8 will produce N-cyclopropyl-N-(γ-formylaminopropyl)benzylamine boiling at 171°–172° C. at 0.7 mm. pressure which upon reduction with LiAlH₄ results in the production of N-cyclopropyl-N-(γ-methylaminopropyl)-benzylamine having a boiling point of 100°–102° C. at 0.7 mm. pressure and a refractive index $n_D^{25}$ of 1.5139.

In like manner, a compound of the formula

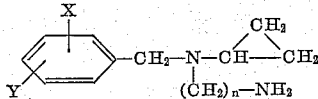

can be reacted with ethyl formate, ethyl acetate, ethyl propionate, ethyl butyrate or a loweralkyl acid chloride to obtain the corresponding substituted N-cyclopropyl-N-benzylamines of the formula

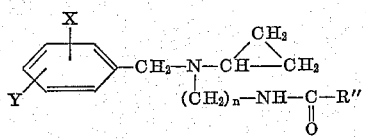

wherein R″ is hydrogen or loweralkyl which upon reduction with LiAlH₄ result in the formation of compounds of the formula

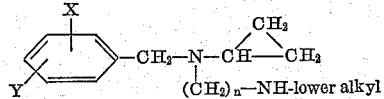

The cyclopropylbenzylamines employed as starting materials in the present invention can be readily prepared by reaction at room temperature of equimolecular proportions of cyclopropylamine with an aldehyde of the formula

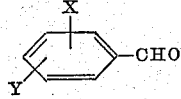

followed by distillation of the reaction mixture to obtain an intermediate of the formula

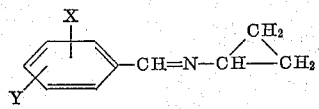

which is then reduced with hydrogen at room temperature in the presence of a palladium catalyst. Thus, N-cyclopropylbenzylamine boils at 80°–81° C. at 5 mm. pressure. N-cyclopropyl-N-o-bromobenzylamine boils at 110° C. at 3.5 mm. pressure, N-cyclopropyl-N-p-chlorobenzylamine boils at 78° C. at 0.1 mm. pressure and N-cyclopropyl-N-3,4-dichlorobenzylamine boils at 98° C. at 0.8 mm. pressure.

What is claimed is:

1. Compounds of the formula

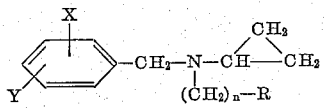

wherein X and Y are each independently selected from the group consisting of hydrogen, loweralkyl, chlorine, bromine, hydroxy, loweralkoxy, amino and lower alkylamino, n is a number from 2 to 4, inclusive, and R is a member of the group consisting of amino, monoloweralkylamino, diloweralkylamino, piperidyl, pyridyl and morpholino.

2. N-cyclopropyl - N - (β-diethylaminoethyl)-benzylamine.

3. N-cyclopropyl - N - (β-dimethylaminoethyl)-benzylamine.

4. N-cyclopropyl - N - (β-diethylaminoethyl)-3,4-dichlorobenzylamine.

5. N-cyclopropyl - N - (β-diethylaminoethyl)-o-bromobenzylamine.

6. N-cyclopropyl - N - (β-diethylaminoethyl)-3,4-dimethoxybenzylamine.

7. N-cyclopropyl-N-(β-aminoethyl)-benzylamine.

8. N-cyclopropyl-N-(γ-aminopropyl)-benzylamine.

9. N-cyclopropyl - N - (β-methylaminoethyl)-benzylamine.

10. N-cyclopropyl - N - (γ-methylaminopropyl)-benzylamine.

References Cited in the file of this patent

UNITED STATES PATENTS

| | | |
|---|---|---|
| 2,670,376 | Scudi et al. | Feb. 23, 1954 |
| 2,917,541 | Anatol et al. | Dec. 15, 1959 |
| 2,953,490 | Deebel | Sept. 20, 1960 |
| 3,050,559 | Burger | Aug. 21, 1962 |

OTHER REFERENCES

Wagner et al.: "Synthetic Organic Chemistry," p. 659 (1953).